(12) United States Patent
Roush et al.

(10) Patent No.: US 8,057,157 B2
(45) Date of Patent: Nov. 15, 2011

(54) SYSTEM FOR DELIVERING AIR FROM A MULTI-STAGE COMPRESSOR TO A TURBINE PORTION OF A GAS TURBINE ENGINE

(75) Inventors: Eric David Roush, Simpsonville, SC (US); William Andrew Parker, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1058 days.

(21) Appl. No.: 11/876,277

(22) Filed: Oct. 22, 2007

(65) Prior Publication Data
US 2009/0104020 A1    Apr. 23, 2009

(51) Int. Cl.
*F01D 19/00*      (2006.01)
*F01D 25/12*      (2006.01)
*F01D 9/06*       (2006.01)
*F01D 5/18*       (2006.01)

(52) U.S. Cl. ............ 415/1; 415/115; 415/116; 415/117; 415/145; 416/96 R; 60/782; 60/785; 60/806

(58) Field of Classification Search .............. 415/1, 115, 415/116, 117, 145; 416/1, 95, 96 R, 96 A, 416/97 R; 60/782, 785, 806
See application file for complete search history.

(56) References Cited

U.S. PATENT DOCUMENTS

| | | | |
|---|---|---|---|
| 6,098,395 A * | 8/2000 | North | 60/782 |
| 6,226,974 B1 | 5/2001 | Andrew et al. | |
| 6,389,793 B1 | 5/2002 | Priestley | |
| 6,481,212 B2 | 11/2002 | Priestley | |
| 6,550,253 B2 * | 4/2003 | Mortzheim et al. | 60/782 |
| 6,584,779 B2 | 7/2003 | Priestley | |
| 6,615,574 B1 | 9/2003 | Marks | |
| 7,168,921 B2 | 1/2007 | Honkomp et al. | |
| 7,698,898 B2 * | 4/2010 | Eluripati et al. | 60/785 |
| 2001/0025476 A1 | 10/2001 | Eldrid et al. | |

* cited by examiner

*Primary Examiner* — Christopher Verdier
(74) *Attorney, Agent, or Firm* — Cantor Colburn LLP

(57) ABSTRACT

A system for providing air from a multi-stage to a turbine includes a turbine having a high pressure input port and a low pressure input port. The system also includes a compressor having at least one high pressure extraction air output and at least one low pressure extraction air output. A valve is fluidly connected to the at least one high pressure extraction air output, at least one low pressure extraction air output and low pressure input port of the turbine. The valve is selectively operated to fluidly connect the at least one low pressure extraction air output with the low pressure input port during normal operating conditions and fluidly connect the at least one high pressure extraction air output and the low pressure input port during a turn down condition or below design temperature operation to enhance turbine engine performance.

13 Claims, 1 Drawing Sheet

SYSTEM FOR DELIVERING AIR FROM A MULTI-STAGE COMPRESSOR TO A TURBINE PORTION OF A GAS TURBINE ENGINE

BACKGROUND OF THE INVENTION

The present invention pertains to the art of gas turbine engines and, more particularly, to a system for delivering air from a multi-stage compressor to a turbine portion of a gas turbine engine to enhance turbine engine performance during low turn down and/or operation below design temperatures.

Turbine engines are designed to operate at full speed, International Organization for Standardization (ISO) conditions. That is, turbine engines are designed to utilize a defined range of input conditions, e.g., design point temperature, barometric pressure, fuel type etc, to operate within a defined speed band to produce an optimal, high, output below which operation is less than efficient. Often times however, input conditions are outside the design points, and/or a lower than full output is desired. During ISO operation, air is fed into a combustor to mix with fuel to form a high pressure, high temperature combustion product that is delivered to the turbine. At full speed, the combustor requires a high volume of air in order to produce enough combustion products to drive the turbine. In addition, various components of the turbine, such as rotor blades, require cooling.

Turbine component cooling circuits use sourced air from a compressor stage that delivers adequate pressure across a majority of an overall operating range of the gas turbine. Most combustion turbines use air that is bled from one or more compressor extraction stages of an integral compressor component to provide for cooling and sealing in the turbine component. Air extracted from the compressor for this purpose may be routed internally through passages formed in a compressor-turbine rotor assembly, or the like, to locations that require cooling and sealing in the turbine component. Alternatively, air may be routed externally through piping that extends between the compressor component and the turbine component.

Extraction air having sufficient pressure during optimal operating conditions often times does not have enough pressure during less than optimal conditions such as when operating below the design point temperature and/or during turn down when output is reduced. In order to provide sufficient pressure during the less than optimal conditions, primary extraction air is supplemented with additional, high pressure, extraction air from a high compressor stage. Unfortunately, while air from a higher stage adds to the cooling air pressure, the use of high pressure air is very inefficient or detrimental to the overall energy producing process. That is, more work is input into forming high pressure air than is required to produce lower pressure extraction air. For this reason, supplemental air is typically limited to mid level compressor stages. If supplemental air is taken from a higher compressor stage, the high stage air is only combined with a medium primary stage extraction air in order to minimize any pressure differential between the extraction stages thereby such that only a small portion of the high stage extraction air is required. In this manner, engine operation remains cost effective during cold days and turn down periods.

BRIEF DESCRIPTION OF THE INVENTION

In accordance with one aspect of the invention, a system for bleeding air from a multi-stage compressor to provide bypass air to a turbine to optimize turbine performance during low turn down and/or operation below design temperature is provided. The system includes a turbine having a plurality of extraction air input ports including a high pressure input port, a medium pressure input port and a low pressure input port. In addition to the turbine, the system includes a multi-stage compressor having a plurality of extraction air outputs including at least one high pressure extraction air output, at least one medium pressure extraction air output and at least one low pressure extraction air output. A valve is fluidly connected to the at least one high pressure extraction air output, at least one low pressure extraction air output and low pressure input port of the turbine. The valve is selectively operated to fluidly connect the at least one low pressure extraction air output with the low pressure input port during normal operating conditions and fluidly connect the high pressure extraction air output and the low pressure input port during one of a low turn down condition and operation below design temperatures.

In accordance with another aspect of the invention, a method of supplying bleed air from a multi-stage compressor to provide bypass air to a turbine to optimize performance of a turbine engine during low turn down and/or below design temperature operation is provided. The method includes operating the turbine engine during optimal operating conditions and operating the turbine engine during non-optimal conditions. During optimal operating conditions, high pressure extraction air is delivered from a high pressure compressor extraction to a high pressure input port on the turbine and low pressure extraction air is delivered from a low pressure compressor extraction to a low pressure input port on the turbine. During non-optimal operating conditions, high pressure bypass extraction air is delivered from the high pressure compressor extraction to both the high pressure input port and the low pressure input port on the turbine.

During turn down and operation below design temperatures, the high pressure extraction has sufficient pressure to adequately feed the high pressure input to the turbine. However, the medium and low pressure extractions no longer have enough pressure to adequately supply the respective medium and low pressure turbine inputs. In the past, using high pressure extraction air was considered very inefficient. At most, high pressure air was employed to supplement medium pressure air delivered to a medium pressure turbine input. Combining high and low pressure air was deemed very inefficient and thus not cost effective.

Surprisingly however, it has been found that routing the high pressure extraction to the low pressure turbine input will cause higher than design pressure ratios on the low pressure input. The increase in air to the low pressure input results in less air being passed to a combustor in the turbine engine. With less air being passed to the combustor, less fuel is required to maintain combustor firing temperature within emissions compliance. Using less fuel also lowers fuel burn rate and, as a consequence, plant output can be lowered to a level beyond what is currently possible, that is, the present invention enables engine turndown to 15%-20% of full output. In this manner, a power plant can operate at a very low turndown and remain on the grid during a period of low demand while at the same time operating generators in a cost efficient manner. As a result, the power plant can quickly ramp up to provide additional output if another system goes down. In addition, by remaining on the grid, the generator is first in line to provide power when demand increases and generator output can be increased to baseload levels.

Additional objects, features and advantages of various aspects of exemplary embodiments of the present invention will become more readily apparent from the following

DETAILED DESCRIPTION OF THE INVENTION

Figure 1:
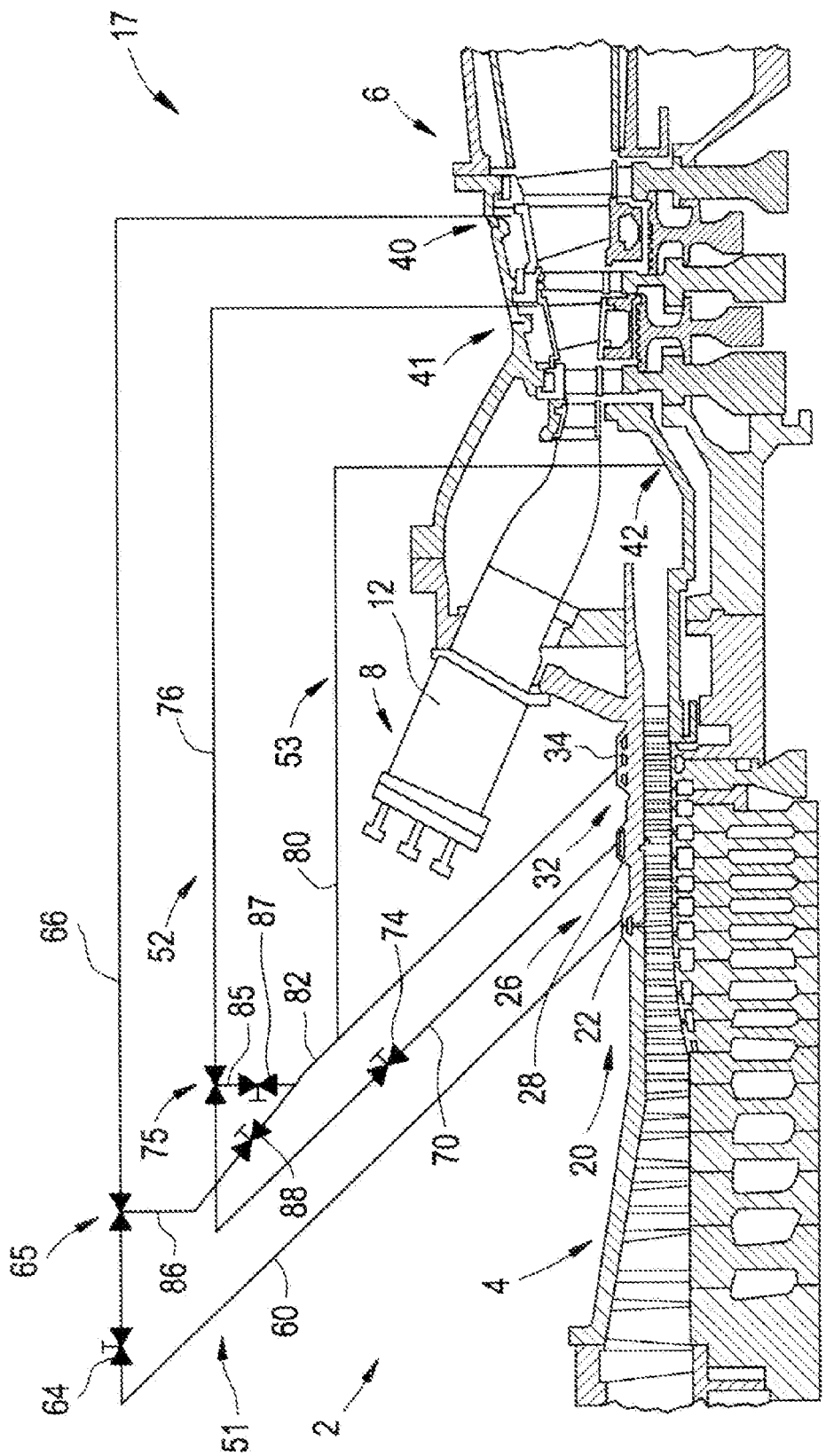
FIG. 1 is a schematic illustration of a turbine engine including a system for delivering air from a multi-stage compressor to a turbine for performance optimization during low turn down and/or while operating below design temperatures constructed in accordance with one aspect of the present invention.

With initial reference to FIG. 1, a gas turbine engine constructed in accordance with an exemplary embodiment of the present invention is generally indicated at 2. Engine 2 includes a compressor 4 operatively connected to a turbine 6 via a shaft (not separately labeled). Engine 2 is further shown to include a combustor assembly 8 including a combustion chamber 12. Combustion gases are produced in combustor assembly 8 and used to drive turbine 6 as will be discussed more fully below.

In operation, air flows into compressor 4 and is compressed into a high pressure gas. The high pressure gas is supplied to combustor assembly 8 and mixed with fuel, for example process gas and/or synthetic gas (syngas). The fuel/air or combustible mixture is passed into combustion chamber 12 and is ignited to form a high pressure, high temperature combustion gas stream of approximately 871° Celsius (C.) to 1621° C. (1600° Fahrenheit (F.) to 2950° F.). Alternatively, combustor assembly 8 can combust fuels that include, but are not limited to, natural gas and/or fuel oil. In any event, combustor assembly 8 channels the combustion gas stream to turbine 6 which coverts thermal energy to mechanical, rotational energy. The high temperatures developed within engine 2 produce a need for cooling in combustor assembly 8 as well as other various components of turbine 6. Towards that end, engine 2 includes cooling system 17.

In accordance with the exemplary embodiment shown, cooling system 17 includes a first casing or plenum portion 20 including a low pressure extraction air outlet 22 fluidly connected to a low pressure stage, such as the 9th stage of compressor 4. Cooling system 17 also includes a second casing or plenum portion 26 having a medium pressure extraction air output 28 fluidly connected to a medium pressure stage, such as the 13th stage of compressor 4 and a third casing or plenum portion 32 having a high pressure extraction air output 34 fluidly connected to a high pressure stage, such as the 18th stage of compressor 4. As will be detailed more fully below, first plenum portion 20 is fluidly connected to a low pressure input port 40 provided on turbine 6. Similarly, second plenum portion 26 is fluidly connected to a medium pressure input port 41 and third plenum portion 32 is fluidly connected to a high pressure input 42 port provided on turbine 6.

As shown, cooling system 17 includes a low pressure extraction circuit 51, a medium pressure extraction circuit 52 and a high pressure extraction circuit 53. Low pressure extraction circuit 51 includes a low pressure output line portion 60 that leads to a low pressure control valve 64. From low pressure control valve 64, low pressure extraction circuit 51 then passes to a low pressure ejector 65 and onto a low pressure output line portion 66 before terminating at low pressure input port 40. Medium pressure extraction circuit 52 includes a medium pressure output line portion 70 that extends to a medium pressure control valve 74. From medium pressure control valve 74, medium pressure extraction circuit 52 extends to a medium pressure ejector 75 and onto a medium pressure output line portion 76 before terminating at medium pressure input port 41 on turbine 6. Finally, high pressure extraction circuit 53 includes a direct line 80 that connects to high pressure input port 42 on turbine 6. High pressure extraction circuit 53 also includes a branch line 82 having first and second high pressure feeder lines 85 and 86. Each high pressure feeder line 85 and 86 includes a corresponding valve 87 and 88. From valves 87 and 88, high pressure feeder lines 85 and 86 connect to low pressure ejector 65 and medium pressure ejector 75 respectively.

With this configuration, under normal ISO operating conditions, various portions of turbine 6, such as airfoils and buckets are supplied with a cooling gas flow from low and medium pressure extraction air outlets 22 and 28. For example, high pressure air from high pressure extraction outlet 34 supplies combustor assembly 8 and high pressure input port 42 on turbine 6. However, under low turn down conditions and/or when operating below design temperatures, such as for example 59° F. (15° C.), the pressure in low pressure extraction circuit 51 and medium pressure extraction circuit 52 is inadequate for supplying respective one of low pressure input port 40 and medium pressure input port 41 with a sufficient mass flow rate of cooling air. Of course it should be understood that 59° F. (15° C.) is but one example of a design point temperature, various other design temperatures can be established depending upon operating location, ambient conditions, elevation, etc. In any event, without adequate pressure, the low and medium pressure extractions must be either supplemented with additional air or output must be increased to a level that ensures adequate cooling for turbine 6 and that engine 2 remains emission compliant. Creating high pressure extraction air requires considerable work by compressor 4. Therefore, in the past it was considered disadvantageous to use high pressure extraction air in lower pressure extraction inputs. Surprisingly however, it has been found that high pressure air can be used advantageously to allow engine 2 to achieve lower levels of output while remaining emission compliant even when operating below design parameters when operation is typically less than at efficient levels.

In accordance with one aspect of the invention, in order to provide low pressure input port 40 and medium pressure input port 41 with an adequate supply of air during non-optimal operating conditions, such as during low turn down periods and/or when operating below design temperatures, low pressure control valve 64 and medium pressure control valve 74 are closed and high pressure valves 87 and 88 are opened. In this manner, high pressure air from compressor 4 is directed into low pressure input port 40 and medium pressure input port 41. The high pressure air causes an overflow in the airfoils and related cooling and purge circuit portions of turbine 6 and provides ample cooling at lower output levels. At the same time, high pressure extraction air continues to flow to high pressure input port 42 to supply turbine 6 with high pressure air. With this arrangement, a large volume of air bypasses combustor assembly 8 creating a lean condition that results in firing temperatures remaining in compliance with emission standards. In addition, temperatures within turbine 6 are lower due to lower output levels, thus the demand for cooling is actually lower. Under these conditions, particularly at very low turndown when output levels are below 40%, utilizing high pressure extractions on low and medium pressure inputs to turbine 6 ensures an adequate supply of cooling air while at the same time operating engine 2 at emission compliant levels at lower levels of turndown.

In accordance with another aspect of the present invention, during non-optimal operating conditions, low pressure control valve 64 and medium pressure control valve 74 remain open and high pressure valves 87 and 88 are also opened to allow a controlled amount of high pressure extraction air to mix with the low pressure extraction air and medium pressure extraction air respectively. In a manner similar to that described above, the combined air streams overflow airfoil portions of turbine 6 and provide ample cooling. As a result, an adequate airflow is maintained at low pressure input port 40 and medium pressure input port 41 while at the same time creating a large cooling circuit pressure ratio that establishes a lean combustion condition in combustor assembly 8 to ensure that firing temperatures remain emission compliant.

At this point it should be appreciated that the present invention derives a particular benefit by increasing cooling circuit pressure ratios and overflowing airfoils of the turbine to enable a power plant to remain on the grid during periods of low demand while at the same operating in a cost efficient manner. As a result, the power plant can be quickly brought up to full output, often times in 15 minutes or less. In addition, by creating an efficient operation condition at very low turn down, engine 2 is first in line to offer power when demand increases and generator output can be increased to baseload levels. The quick response time enables an energy supplier to quickly ramp up output if a sudden, unexpected, increase in demand occurs. That is, the present invention creates higher than design pressure ratios on the medium the low pressure turbine inputs which, unexpectedly, enable the turbine to operate at a very low turn down and/or below design temperature while not sacrificing baseload, ISO day performance.

In any event, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for providing air from a multi-stage compressor to a gas turbine comprising:
    a gas turbine including a plurality of extraction air input ports including a high pressure input port, a medium pressure input port and a low pressure input port;
    a multi-stage compressor including a plurality of extraction air output including a high pressure extraction air output, a medium pressure extraction air output and a low pressure extraction air output;
    a first control valve provided between the low pressure extraction air output and low pressure input port and a second control valve being provided between the high pressure extraction air output and the low pressure input port, the first valve being selectively operated to fluidly connect the low pressure extraction air output with the low pressure input port during normal operating conditions and the second valve being selectively operated to fluidly connect the high pressure extraction air output and the low pressure input port during one of a turn down condition and operation below design temperature.

2. The system of according to claim 1, wherein during the one of the turn down condition and operation at below design temperature the first control valve is closed and the second control valve is open.

3. The system according to claim 1, wherein during the one of the turn down condition and operation below design temperature each of the first and second control valves is open.

4. The system according to claim 3, further comprising: an ejector positioned between the second control valve and the low pressure input port.

5. The system of claim 1, further comprising: a third control valve and a fourth control valve, the third control valve being positioned between the medium pressure extraction air output and the medium pressure input port, and the fourth control valve being provided between the high pressure extraction air output and the medium pressure input port.

6. The system according to claim 5, further comprising: an ejector positioned between the fourth control valve and the medium pressure input port.

7. The system according to claim 5, wherein, during the one of the turn down condition and operation below design temperature the third control valve is closed and the fourth control valve is open.

8. The system according to claim 5, wherein during the one of the turn down condition and operation below design temperature each of the third and fourth control valves is open.

9. A method of supplying air from a multi-stage compressor to provide air to a turbine to enhance gas turbine engine performance, the method comprising:
    operating the gas turbine engine during normal operating conditions including:
    delivering high pressure bypass extraction air from a high pressure compressor extraction to a high pressure input port provided on the turbine; and
    delivering low pressure bypass extraction air from a low pressure compressor extraction to a low pressure input port provided on the turbine; and
    operating the turbine engine during one of a turn down condition and below design temperature operation including:
    delivering high pressure bypass extraction air from the high pressure compressor extraction to both the high pressure and low pressure input ports provided on the turbine.

10. The method of claim 9, wherein only high pressure bypass air is delivered to the low pressure input port during the one of the turn down condition and below design temperature operation.

11. The method of claim 9, further comprising: delivering a combined high pressure extraction air and low pressure extraction air to the low pressure input port during the one of the turn down condition and below design temperature operation.

12. The method of claim 9, delivering high pressure bypass extraction air from the high pressure compressor extraction to both the high pressure input port and a medium pressure input port provided on the turbine during the one of the turn down condition and below design temperature operation.

13. The method of claim 12, wherein, only high pressure extraction bypass air is delivered to the medium pressure input port during the one of and the turn down condition and below design temperature operation.

* * * * *